Patented Oct. 20, 1953

2,656,300

UNITED STATES PATENT OFFICE 2,656,300

METHODS FOR PRODUCING STREPTOMYCIN AND VITAMIN B$_{12}$

Robert B. McCormack and Asger F. Langlykke, Highland Park, and David Perlman, Princeton, N. J., assignors, by mesne assignments, to Mathieson Chemical Corporation, Baltimore, Md., a corporation of Virginia No Drawing. Application February 3, 1949, Serial No. 74,482

7 Claims. (Cl. 195—80)

This invention relates to methods of producing medicinally-useful substances (inter alia, antibiotics and vitamins) by culturing organisms.

Prior to this invention, it had been shown that a potent antibiotic, called streptomycin, is present in the culture liquid obtained when a suitable strain of the organism *Streptomyces griseus* is grown in or on certain liquid nutrient media (Schatz, Bugie, and Waksman, Proc. Soc. Exp. Biol. and Med., 1944, 55, 66); and that the solids (the mycelia, spores, and other sedimentable solids) of a culture of *Streptomyces griseus* that has produced streptomycin contain additional streptomycin, which may be obtained by subjecting these solids to extraction with an aqueous acid, and recovering the streptomycin in the extract (application Serial No. 586,824, filed April 5, 1945, now Patent No. 2,461,922, dated February 15, 1949). [The term "extraction" is used herein in its broad sense, and hence comprehends elution; i. e., the separation (e. g., of adsorbed material) by washing.]

Although such "acid-extraction" of the culture solids is highly advantageous in that it provides an additional yield of streptomycin (or enhances the activity of the streptomycin-containing culture liquid), the reactivity with the extraction equipment thereby introduced necessitates the use of acid-proof equipment.

It is the object of this invention to provide improved methods of recovering the streptomycin in the solids of a culture of *Streptomyces griseus* that has produced streptomycin.

The methods of this invention essentially comprise subjecting the solids of a culture of *Streptomyces griseus* that has produced streptomycin to extraction with an aqueous medium whose concentration of highly-dissociatable salts is substantially greater than that of the culture liquid, and recovering the streptomycin in the extract. [By "culture of *Streptomyces griseus* that has produced streptomycin" is meant, of course, the culture obtained by growing a streptomycin-producing strain of *Streptomyces griseus* under conditions and in a medium suitable for the production of streptomycin.] The extraction of the solids may be effected either while they are still in the culture or after their separation from the culture liquid, or at both stages.

Thus, the extraction may be effected by adding a highly-dissociatable salt to the (whole) culture [after the fermentation has proceeded to the desired extent, generally until substantially maximum streptomycin productivity has been reached], and intimately contacting the solid and liquid components of the culture. In this case, the streptomycin in the solids is extracted into the streptomycin-containing liquid; and, on separation of the solids by centrifugation and/or filtration, a streptomycin-containing culture liquid (A) of enhanced activity is obtained. Alternatively, the solids are first separated from the culture liquid, in which case the filtrate (B) corresponds to the streptomycin-containing culture liquid obtained prior to use of the "acid-extraction" invention; the separated solids (which may first be washed with water, the washings being discarded) are then extracted with an aqueous medium containing a highly-dissociatable salt; and from this extract (B$_1$), streptomycin may be obtained. As a further alternative, the solids are first subjected to "acid-extraction" or "salt-extraction" while they are still in the culture, then separated from the (enhanced-activity) culture liquid A, and the separated solids, then treated with an aqueous medium containing a highly-dissociatable salt to obtain an extract (A$_1$) containing additional streptomycin. The preparations A and B$_1$, as well as preparation B (separately, or combined with B$_1$) and A$_1$ (separately, or combined with A) may be used or further treated as primary streptomycin-containing liquids (e. g., treated to purify and recover the streptomycin and/or a derivative thereof, e. g., dihydrostreptomycin) and/or to recover the vitamin B$_{12}$ content thereof.

The nature of the highly-dissociatable salt employed does not have a qualitative effect on the extraction, provided, of course, that the salt does not precipitate or inactivate the streptomycin; preferably, the salt is a water-soluble alkalimetal (including ammonium) or alkaline earth metal salt of a low-molecular-weight acid, such as hydrochloric, sulfuric, nitric, acetic, tartaric, and citric acids (inter alia, sodium chloride, sodium citrate, sodium nitrate, sodium sulfate, ammonium chloride, ammonium tartrate, ammonium sulfate, potassium chloride, calcium chloride, calcium sulfate, barium chloride, magnesium sulfate, ammonium acetate, and aluminum potassium sulfate).

The concentration of the salt required to effect maximum extraction of streptomycin from the culture solids is generally less than about 1.0 molar. Thus, the salts listed hereinafter are effective in obtaining maximum recovery in the molar concentrations indicated:

NaCl ............................................. 1.0
NH$_4$Cl ........................................... 0.1
Ammonium tartrate ........................ 0.1
Na$_2$SO$_4$ ......................................... 0.05
KCl .............................................. 0.8
MgSO$_4$.7H$_2$O .................................. 0.025
BaCl$_2$ ............................................ 0.1
(NH$_4$)$_2$SO$_4$ ..................................... 0.4
CaCl$_2$ ............................................ 0.025

The "salt-extraction" of this invention (like "acid-extraction") facilitates separation of the culture solids by centrifugation, because it promotes coagulation of the solids. The "salt-extraction" may, of course, be combined with the "acid-extraction" priorly used, the presence of acid facilitating filtration of the extract as well as lowering the concentration of the salt required for maximum extraction. [Filtration of the extract is facilitated also by use of a filter aid (e. g., a diatomaceous-earth filter-aid such as Celite), both with salt and salt-plus-acid extraction.] Actually, relatively slight pH adjustment in either direction (from the normal pH of the culture liquid at the end of the fermentation), e. g., by addition of sulfuric acid or sodium hydroxide, enhances the effectiveness of a low concentration of the salt in extracting the antibiotic. Furthermore, mixtures of salts may be used. The salt, or mixture of salts, or mixture of salt and acid may be added in undissolved or aqueous-solution form (preferably concentrated).

The primary streptomycin-containing liquids obtained in accordance with this invention may advantageously be purified and/or further treated as follows—preferably after partial purification by treating the primary streptomycin-containing liquid (desirably, after being substantially neutralized, if not already so) with an activated charcoal or a cation-exchange resin of the carboxylic-acid type (such as IRCO$_{50}$) and eluting the streptomycin from the adsorbent with an aqueous, water-soluble mineral acid:

1. The impure streptomycin-containing liquid is intimately contacted with a surface-active agent of the organically-substituted polybasic-inorganic-acid type and a substantially water-immiscible organic solvent for soaps; the organic solvent phase is recovered; and the salt-type derivative of streptomycin therein is converted into a water-soluble salt of streptomycin. [This purification method is the subject of Lott, Bernstein and Heuser application Serial No. 767,851, filed August 9, 1947, now Patent No. 2,537,933, dated January 9, 1951.]

1—alternative. The impure streptomycin-containing liquid is treated with a surface-active agent of the organically-substituted polybasic-inorganic acid type; and the insoluble salt-type combination of streptomycin and the surface-active agent is recovered, and converted into a water-soluble salt of streptomycin. [This purification method is the subject of Lott, Bernstein and Heuser application Serial No. 767,852, filed August 9, 1947, now Patent No. 2,537,933, dated January 9, 1951.]

2. The impure streptomycin-containing liquid, or an aqueous solution of purified streptomycin obtained as described in Section 1 or 1—alternative hereinbefore, is treated with hydrogen in the presence of a hydrogenation catalyst to obtain dihydrostreptomycin.

It has been found that the "salt extract" B$_1$, as well as the corresponding "acid extract" [i. e., the extracts obtained from solids separated from the culture without prior addition of a salt and/or acidification] may contain about half of the streptomycin in the culture, and that their water-soluble-impurity content is relatively low, as compared with filtrate B; also, that a higher recovery of streptomycin is obtained when the solids are extracted after separation from the culture liquid. Accordingly, it may be advantageous to filter, then extract, and treat filtrate B and extract B$_1$ separately. By treating extract B$_1$ separately (or the similar extract obtained by "acid-extraction"), the carbon-adsorption step may be eliminated, there being a high loss (generally about 40%) on purification by carbon adsorption and elution. Moreover, the relatively-low water-soluble-impurity content of extract B$_1$, (or the similar extract obtained by "acid-extraction") makes possible the direct conversion of the streptomycin therein to dihydrostreptomycin and purification of the dihydrostreptomycin formed (instead of first purifying the streptomycin and then converting it to dihydrostreptomycin).

Vitamin B$_{12}$, which is formed along with the streptomycin (McCormack application Serial No. 53,761, filed October 9, 1948), also is extracted from the culture solids by the "salt-extraction"; and in this connection, "salt-extraction" is advantageous over "acid-extraction," because part of the vitamin B$_{12}$ formed is in acid-precipitable form (and hence is not recoverable from the acid extracts). Thus, liquids A, B, and B$_1$ may be treated to recover the vitamin B$_{12}$ as the primary product [for example, by extraction with 88% phenol or by treatment with an activated charcoal which is a good adsorbent for vitamin B$_{12}$]; or these liquids may be treated to recover the streptomycin as the primary product [for example, by treatment of the liquid with an activated charcoal or cation-exchange resin which is a good adsorbent for streptomycin, and elution of the streptomycin] and to recover the vitamin B$_{12}$ as a by-product [in the charcoal treatment, by elution of the charcoal (after removal of streptomycin) with aqueous acetone or aqueous isopropyl alcohol, for example; and in the resin treatment, by treatment of the liquid (after removal of the resin and adsorbed streptomycin) with an activated charcoal, for example, which adsorbs vitamin B$_{12}$, and elution therefrom].

Although the extraction of streptomycin from the culture solids, as measured by bioassay, rises to a peak and then falls as the concentration of the salt is increased (especially on extraction with salts of polyvalent ions, e. g., magnesium sulfate, ammonium sulfate, calcium chloride and sodium sulfate), chemical assay indicates the drop in streptomycin titer to be apparent rather than real, i. e., to be due to the effect of the salt on the bioassay. The optimum concentration of any particular salt is readily determinable, being the lowest concentration capable of effecting substantially complete extraction of the streptomycin in the solids of the culture.

Salts (especially sodium chloride) are often included in the medium in which the *Streptomyces griseus* is grown for the production of streptomycin, being added separately and/or contained in the soybean meal or other medium component; and a highly-dissociatable salt may therefore be present in the culture liquid at the end of the fermentation. However, such salt is not present in sufficient concentration to effect substantial extraction of the streptomycin in the mycelium; and the initial inclusion of sufficient salt to effect such extraction would inhibit the production of streptomycin as well as increase the corrosion of the fermentation equipment.

The following examples are illustrative of the invention:

Example 1 a. 1100 gal. of an aqueous (tap water) medium containing 2.25% soybean meal and 1.62% hydrated dextrose (e. g., Cerelose) is placed in a 1300-gal. carbon-steel fermentation tank equipped with a stirrer and air sparger; and the tank is sterilized for one hour at 120° C. When the temperature reaches 25° C., 50 gal. of a streptomycin-producing strain of *Streptomyces griseus* inoculum is added; and the inoculated medium is incubated at 25° C. under a pressure of 3-6 lbs. per square inch (an average of 1 cu. ft. air/gal. medium/hour being passed through the medium) while stirring (at a rate of 120 R. P. M.). During the incubation, 5.6 liters of lard oil is added dropwise as an antifoam agent.

b. 0.12 g. $MgSO_4 \cdot 7H_2O$ is added to 10 ml. of a two-day old culture prepared as described in *a* (the filtrate of which has a potency of 183 units/ml., and a pH of 7.3); and the mixture is well shaken for 15 minutes, centrifuged, and the supernate separated. The supernate, which has a potency of about 275 units/ml., is used or further treated as a streptomycin-containing culture filtrate, e. g., treated to purify and recover the streptomycin and/or convert the streptomycin to dihydrostreptomycin, and (if desired) to recover vitamin $B_{12}$ as a by-product.

Example 2

9.5 g. sodium sulfate is added to 250 ml. of a 41-hour old streptomycin-containing culture (prepared, for example, as described in *a* of Example 1), the filtrate of which has a potency of 157 units/ml. and a pH of 6.35; and the mixture is agitated thoroughly for 30 minutes, and filtered. The filtrate has a streptomycin potency of about 325 units/ml.

Example 3

To a streptomycin-containing culture having a potency of 138 units/ml. and a pH of 5.95 is added sufficient sodium chloride and sodium hydroxide to make the culture liquid a 0.1 molar and 0.001 molar solution thereof, respectively, the pH being about 6.7; and the mixture is agitated thoroughly and filtered. The filtrate has a streptomycin potency of about 192 units/ml., as contrasted with practically no enhancement of potency on adding sodium hydroxide to molar concentrations as high as 0.012 without the sodium chloride.

Example 4

To a streptomycin-containing culture having a potency of 138 units/ml. and a pH of 5.95 is added sufficient sodium chloride and sulfuric acid to make the culture liquid a 0.1 molar and 0.035 molar solution thereof, respectively, the pH being about 2.05; and the mixture is agitated thoroughly and filtered. The filtrate has a streptomycin potency of about 218 units/ml., as contrasted with an enhancement of potency to only about 184 units/ml. on adding sulfuric acid to a molar concentration of 0.031 without the sodium chloride.

Example 5

To a streptomycin-containing culture having a potency of 138 units/ml. and a pH of 5.95 is added sufficient sodium chloride to make the culture liquid a 0.5 molar solution thereof, the pH being about 5.85; and the mixture is agitated thoroughly and filtered. The filtrate has a streptomycin potency of about 185 units/ml.; and practically no enhancement of potency is effected by adjusting the pH in either direction when using a sodium chloride solution of such or higher molarity [the potency being raised to about 195 units/ml. on extraction with a 1.0 molar sodium chloride solution].

Example 6

A two-day old streptomycin-containing culture (prepared for example, as described in section *a* of Example 1) is filtered. The filtrate, having a potency of about 180 units/ml., is further treated in the conventional manner to purify and recover the streptomycin therein and/or to convert it to dihydrostreptomycin.

The solids filtered off are extracted with a volume of 0.2 molar sodium chloride solution equal to the volume of the culture, and filtered. This filtrate, having a potency of about 140 units/ml., is treated either separately or together with the original culture filtrate to purify and recover the streptomycin and/or convert the streptomycin to dihydrostreptomycin. The total streptomycin recovery thus obtainable exceeds that obtainable by "acid-extraction" of the culture.

Essentially the same recovery of streptomycin from the separated culture solids is obtained by using a 0.1 molar solution of sodium sulfate or a 0.05 molar solution of magnesium sulfate in place of the 0.2 molar solution of sodium chloride; and pH adjustment is substantially without effect in extracting the separated culture solids with the salt solutions.

Extraction of the separated culture solids with a volume of the salt solution (or acid solution) substantially less than the volume of the culture liquid serves as a means of obtaining a relatively concentrated solution of streptomycin.

Example 7

To a streptomycin-containing culture having a potency of 130 units/ml. and a pH of 7.3 was added sufficient sodium sulfate to make the culture liquid a 0.1 molar solution thereof, and the enhancement of potency determined at various pH levels; the results were as follows [the potency of the culture at the same pH levels without the addition of sodium sulfate being given for comparison]:

| pH | Approximate potency of culture (units/ml.) | |
|---|---|---|
| | With sodium sulfate | Without sodium sulfate |
| 1.2 | 242 | 240 |
| 3.3 | 249 | 242 |
| 7.3 | 232 | 130 |
| 8.0 | 232 | 172 |
| 9.0 | 234 | 185 |
| 10.0 | 234 | 202 |

As indicated by these results, extraction by a 0.1 molar sodium sulfate solution is virtually unaffected by pH; and conversely, pH adjustment may be made for such purposes as ease of filtration without materially affecting the salt extraction.

Example 8

To a three-day old streptomycin-containing culture prepared as described in *a* of Example 1 except for the inclusion of 1 mg./liter of $CoCl_2 \cdot 6H_2O$ in the medium to enhance vitamin $B_{12}$ production is added sufficient $MgSO_4 \cdot 7H_2O$ to make the culture liquid a 0.05 molar solution thereof; and the mixture is agitated thoroughly and filtered. The filtrate, having a vitamin $B_{12}$ content of 0.18 gamma/ml., may be treated as described in the aforementioned McCormack application to recover the vitamin $B_{12}$ as the primary product or as a by-product of streptomycin.

Similar salt-extraction with the following salts in the concentration indicated yields filtrates of the indicated vitamin $B_{12}$ content:

| Salt | Concentration (molar) | Vitamin $B_{12}$ Content (gamma/liter) |
|---|---|---|
| NaCl | 0.01 | 0.08 |
| NaCl | 1.25 | 0.19 |
| $MgSO_4 \cdot 7H_2O$ | 0.002 | 0.10 |
| Sodium citrate | 0.25 | 0.16 |
| KCl | 0.25 | 0.18 |
| Aluminum potassium sulfate | 0.05 | 0.16 |
| Ammonium acetate | 0.25 | 0.18 |
| $CaCl_2$ | 0.25 | 0.20 |

Salt-extraction with the same salts and in the same molar concentrations may be applied to the solids which have been separated from the culture liquid without treatment, yielding filtrates of high vitamin $B_{12}$ (as well as streptomycin) content.

The "salt-extraction" of this invention is of general utility, being applicable to other species of Streptomyces which produce antibiotics. Thus, the solids of a culture of *Streptomyces venezuelae* that has produced chloramphenicol [Science 106:417 (October 31, 1947)] contain additional chloramphenicol, which may be obtained by subjecting these solids to "salt-extraction," and recovering the chloramphenicol in the extract; the procedure being fully analogous to that described hereinbefore for extraction of streptomycin from the solids of a culture of *Streptomyces griseus* that has produced streptomycin.

The invention may be variously otherwise embodied within the scope of the appended claims.

We claim:

1. The method of producing streptomycin, which comprises culturing *Streptomyces griseus* in contact with a suitable liquid nutrient medium to produce streptomycin, adding a highly-dissociatable salt to the culture, intimately contacting the solid and liquid components of the culture, and separating the liquid component from the solid component.

2. The method of producing streptomycin, which comprises culturing *Streptomyces griseus* in contact with a suitable liquid nutrient medium to produce streptomycin, separating the solids from the culture, subjecting the solids to extraction with an aqueous medium whose concentration of highly-dissociatable salts is substantially greater than that of the culture liquid, and separating the extract from the solids.

3. The method of producing streptomycin, which comprises culturing *Streptomyces griseus* in contact with a suitable liquid nutrient medium to produce streptomycin, subjecting the solids of the culture to extraction with an aqueous medium whose concentration of highly-dissociatable salts is substantially greater than that of the culture liquid and whose pH is either side of that of the culture liquid at the end of the culturing, and separating the extract from the solids.

4. The method of producing streptomycin, which comprises culturing *Streptomyces griseus* in contact with a suitable liquid nutrient medium to produce streptomycin, subjecting the solids of the culture to extraction with an aqueous medium whose concentration of highly-dissociatable salts is substantially greater than that of the culture liquid and whose pH is lower than that of the culture liquid at the end of the culturing, and separating the extract from the solids.

5. The method of producing streptomycin, which comprises culturing *Streptomyces griseus* in contact with a suitable liquid nutrient medium to produce streptomycin, separating the solids from the culture, subjecting the solids to extraction with an aqueous medium whose concentration of highly-dissociatable salts is substantially greater than that of the culture liquid and whose volume is substantially less than that of the culture liquid, and separating the extract from the solids.

6. The method of producing streptomycin, which comprises culturing a streptomycin-producing strain of *Streptomyces griseus* in submerged culture in a liquid nutrient medium essentially comprising soybean meal and dextrose, subjecting the solids of the culture to extraction with an aqueous medium whose concentration of highly-dissociatable salts is substantially greater than that of the culture liquid, and separating the extract from the solids.

7. In the method of producing a *Streptomyces griseus* metabolite of the group consisting of streptomycin and vitamin $B_{12}$, the steps of culturing *Streptomyces griseus* in contact with a liquid nutrient medium suitable for the production of said metabolite, subjecting the solids of the culture to extraction with an aqueous medium whose concentration of highly-dissociatable salts is substantially greater than that of the culture liquid, and separating the extract from the solids.

ROBERT B. McCORMACK.
ASGER F. LANGLYKKE.
DAVID PERLMAN.

References Cited in the file of this patent

UNITED STATES PATENTS

| Number | Name | Date |
|---|---|---|
| 2,461,922 | Rake | Feb. 15, 1949 |

OTHER REFERENCES

Smith, Nature, 161 (1948), pages 638, 639.
Science 108, No. 2814, December 3, 1948, pages 634–635.